United States Patent [19]

Lopata et al.

[11] Patent Number: 4,902,329
[45] Date of Patent: Feb. 20, 1990

[54] METHOD OF USING EXTERNAL SYSTEM FOR LOCATING THE GEOMETRIC CENTER OF AN INTERNAL LENS ELEMENT

[75] Inventors: Donald J. Lopata, Horseheads; Robert L. Mathew, Elmira, both of N.Y.

[73] Assignee: Corning Incorporated, Corning, N.Y.

[21] Appl. No.: 223,169

[22] Filed: Jul. 22, 1988

[51] Int. Cl.$^4$ ............................................. C03B 00/00
[52] U.S. Cl. ............................................. 65/29; 65/39; 65/47; 65/61; 65/357; 220/2.1 A; 313/408
[58] Field of Search .................... 65/29, 39, 47, 58, 61, 65/357, 361; 220/2.1 A; 313/408

[56] References Cited

U.S. PATENT DOCUMENTS

| | | | |
|---|---|---|---|
| 3,369,881 | 2/1968 | Bennett et al. | 65/61 X |
| 3,390,974 | 7/1968 | Parsons et al. | 65/361 X |
| 3,558,298 | 1/1971 | Carmi et al. | 65/361 X |
| 3,737,065 | 6/1973 | Palac | 65/58 X |
| 4,150,320 | 4/1979 | Mitchell et al. | 313/478 |
| 4,387,404 | 6/1983 | Feinberg et al. | 313/64 |
| 4,672,458 | 6/1987 | McKechnie | 350/571 |

FOREIGN PATENT DOCUMENTS 4917005  6/1970  Japan ...................... 65/357

Primary Examiner—Robert L. Lindsay
Attorney, Agent, or Firm—Burton R. Turner; Richard N. Wardell

[57] ABSTRACT

A system is disclosed for externally locating the geometric center of an internal lens element which requires that an external reference surface be accurately formed so as to lie concentrically with the central axis of the internal lens element. This is accomplished in a pressing operation by precisely aligning and securing a ring element to a plunger member. Three points are then selected on the outer reference surface which are not only utilized for positioning the internal lens element for grinding an outer surface to a desired thickness, but also are utilized for aligning and affixing an external lens system in geometric alignment with the internal lens.

12 Claims, 2 Drawing Sheets

METHOD OF USING EXTERNAL SYSTEM FOR LOCATING THE GEOMETRIC CENTER OF AN INTERNAL LENS ELEMENT

BACKGROUND OF THE INVENTION

This invention relates to a referencing or alignment system for properly positioning an external lens system in accurate alignment with the geometric center of an inside lens element, and more particularly to method and apparatus for accurately locating a projection lens system externally of a cathode ray tube (CRT), such as a TV tube, with the geometric center of a lens element formed on the inside surface of the panel of the TV tube, while such tube is sealed and under vacuum.

It is contemplated that the next generation of cathode ray tubes for projection TV will have a lens element located on the inside surface of the CRT panel face. Such lens element will become an integral part of the total projection TV lens system utilized in such projection TV. Thus, it is contemplated in the pressing of the panel, to form a spherical or aspherical lens on the inside surface of the panel simultaneously with the pressing of the panel per se. The tube which is formed with the panel lens is processed through the normal tube making operations including the screening, aluminizing, frit sealing, gun insertion, and exhaust procedures utilized in normal tube making processes.

After the TV bulb with the lens element is made into a projection TV tube, a problem arises as to how to align the lens on the inside of the evacuated tube with an external projection TV lens system. That is, to effectively utilize the lens that is molded into the inside surface of the panel, the lens itself must be accurately aligned with the external projection lens system. This has presented a problem to the set manufacturers, since after the tube is made, there is no longer access to the inside lens surface since the tube is exhausted and sealed, and therefore an external alignment with the internal lens is not an easy situation. Although an optical laser alignment or other system could possibly be established externally of the tube, such a system would not only be complex and involve numerous alignment steps but also would incur undue expense.

U.S. Pat. No. 4,150,320 discloses an integral lens cathode ray tube system wherein a curved glass panel is disposed, by means of an optical resin material, in a manner related to the viewing portion of the cathode ray tube, such that an exterior double concave or convexal concave lens is provided. U.S. Pat. No. 4,387,404 sets forth a projection television tube alignment means and method, and points out the fact that precision aligning of the projection tubes is essential in projection television systems. U.S. Pat. No. 4,672,458 relates to a projection television system and shows the complexity of the conventional system of externally mounted lenses.

In order to overcome the alignment problems associated with an internal lens and an external projection system, it is an object of the present invention to provide an external system for locating the geometric center of a lens element located on the inside of an enclosure, such as the panel of a projection TV CRT, such that the CRT can be assembled into an accurately aligned system composed of the internal CRT lens element and an external projection TV lens system.

SUMMARY OF THE INVENTION

In its simplest form, the present invention sets forth a new concept in providing a reference system for referencing or locating the geometric center of an inside lens surface formed on an inner surface of a TV panel, from outer surface portions of such panel. That is, a basic component of the referencing system is the use of a part of the panel per se which, by design, will be accurately referenced to the center of the lens element forming the curvature of the inside surface of the panel. In order to accomplish such result, a plunger having a ring precisely locked in place at a given position on the plunger itself is used with multiple molds. The ring is designed and machined so that the center line of the ring and the central axis of the plunger are co-incident. The ring is centered on and precisely attached to the plunger during the panel pressing operation, which provides a unique ring-like surface from which arbitrarily selected alignment points may be referenced to locate the center of the lens element. That is, since the outside ring surface formed on the panel is aligned with the inside lens surface, any three points (not all in alignment) may be picked on the outside of the ring portion to become the reference points for locating the geometric center of the lens.

After the panel has been pressed and annealed, it is positioned within a fixture having a three-point alignment system which corresponds to the selected alignment points on the panel ring. The fixture has a vacuum chuck which is contoured to complement the lens portion of the panel, and the panel is adjusted on the chuck so that the ring portion of the skirt contacts with the three alignment points of the fixture. It is then held in position by the vacuum, or mechanically if desired, and the outside surface of the panel opposite the lens is ground and polished to a given panel thickness. Upon completion of the grinding and polishing of the outer surface of the panel, the three alignment points describe a plane which is not only parallel to the planer outside surface of the lens, but also the three points describe a plane which is at a given predetermined distance from the plane of the outside surface of the panel. Thus, the set manufacturer need only to reference the external lens system on the flat ground surface on the outside of the panel face and utilize the same three alignment points on the external ring portion of the panel to accurately locate the inside lens surface from the outside of the tube.

DESCRIPTION OF THE PREFERRED EMBODIMENTS

Figure 1:
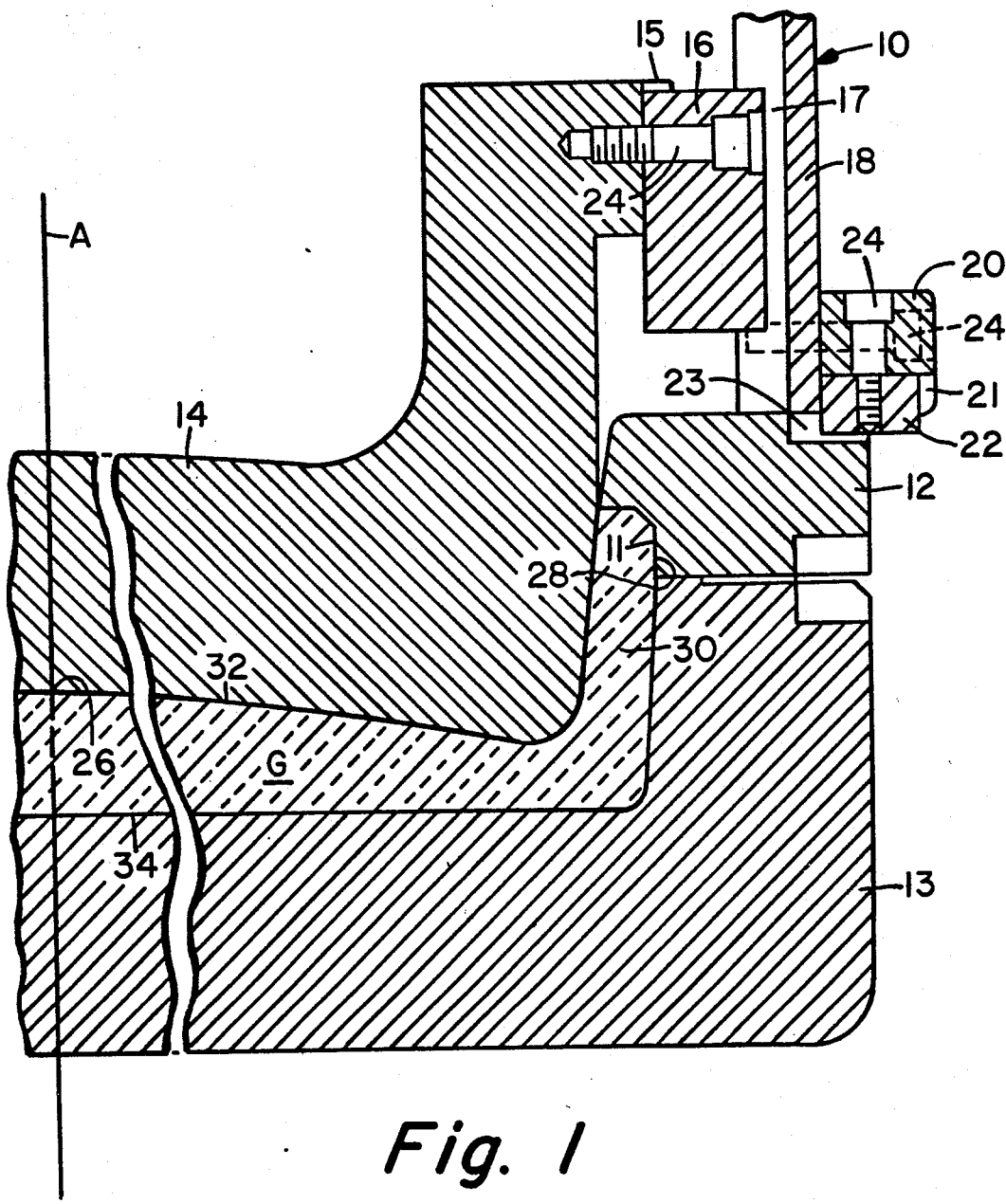
FIG. 1 is a fragmental somewhat schematic elevational view in section of a plunger and ring assembly utilized in the present invention for pressing a lens element on the inner surface of a TV panel and locating the geometric center thereof.

Referring now to the drawings, and particularly FIG. 1, an accurate mounting assembly 10 including keys and keyways is shown for mounting and centering a ring 12 on a plunger 14, such that the plunger 14 and ring 12 are concentric with each other about a central axis A. The mounting assembly 10 includes a plunger alignment key 16, a guide block 18, a ring adapter 20, and a ring alignment key 22. Plunger alignment key 16 is mounted in a keyway 15 formed on an outer rim of the plunger 14. Plunger alignment key 16 also engages the keyway 17 of the guide block 18, whereas ring adapter 20 is keyed on an exterior surface of the guide block 18 for vertical positioning, and ring alignment key 22 locates the ring 12 in x and y directions by means of keyway 21 formed in the ring adapter 20, and keyway 23 formed in an upper surface of the ring 12. Suitable bolts 24 tighten and lock the various keys in the desired position when the center line of the ring is coincident with axis A, and ring surface 11 is concentric about axis A. Thus, the mounting assembly 10 insures the alignment of the ring assembly 12 with the plunger 14, which results in a constant relationship between the center of the plunger 14, intersected by axis A, add the inner surface 11 of ring 12. Accordingly, the glass article G, (such as a TV panel) molded between a mold 13, plunger 14 and ring 12, will have a central inner surface which at its central thickest portion 26 is intersected by axis A which is concentric with an outer ring portion 28 formed by surface 11 of ring 12.

It thus will be apparent that a basic component of the alignment system is the use of an outer rim part of the panel that, by design, accurately references the center of the lens element formed by the curvature of the inside of the panel. The ring 12 is designed and machined so that the center line of the ring and the plunger 14, when the ring is accurately mounted by assembly 10 to the plunger 14, are coincident. The ring 12 is precisely located in place on the plunger 14 by the mounting assembly 10 such that the ring is centered on and attached to the plunger during the panel pressing operation so that the plunger surface forms the lens element and the inner ring surface simultaneously forms an outer reference ring portion. Since each panel is pressed with an integral plunger and ring combination, the pressing provides a unique surface from which to reference the desired alignment points. That is, since the ring surface 11 of ring 12 is aligned and centered with respect to the inside surface of the plunger 14 where it intersects central axis A, the outside ring surface 28 of the pressed glass article G is aligned with the inside lens surface at its thickest center point 26, also intersected by central axis A. Accordingly, three reference points may be chosen about the outer ring portion 28 of the article G which will be at a given vertical distance (as referenced to FIG. 1) from the central portion 26 of the lens element 32.

The glass article G formed by the plunger, mold and ring assembly, as shown in FIG. 1, is in the form of a TV panel having a skirt portion 30, a lens element 32 forming the inner surface of the panel, and an outer face 34. Three points which are not all in a straight line are selected and precisely determined on the outside ring portion 28 of the skirt 30 so as to lie within a plane at a predetermined distance offset from the center 26 of inner lens surface 32 along central axis A. The selected points, shown as a, b, and c in FIG. 3, must be located on the ring portion 28 of the glass panel G, since the outside ring surface 28 is aligned with the inside lens surface 26 by means of the ring 12 being precisely held in a given concentric position on the plunger 14 during the pressing operation. Accordingly, the selected points a, b, c, reference the center 26 of the lens element 32 formed on the inside surface of the panel G.

Figure 2:
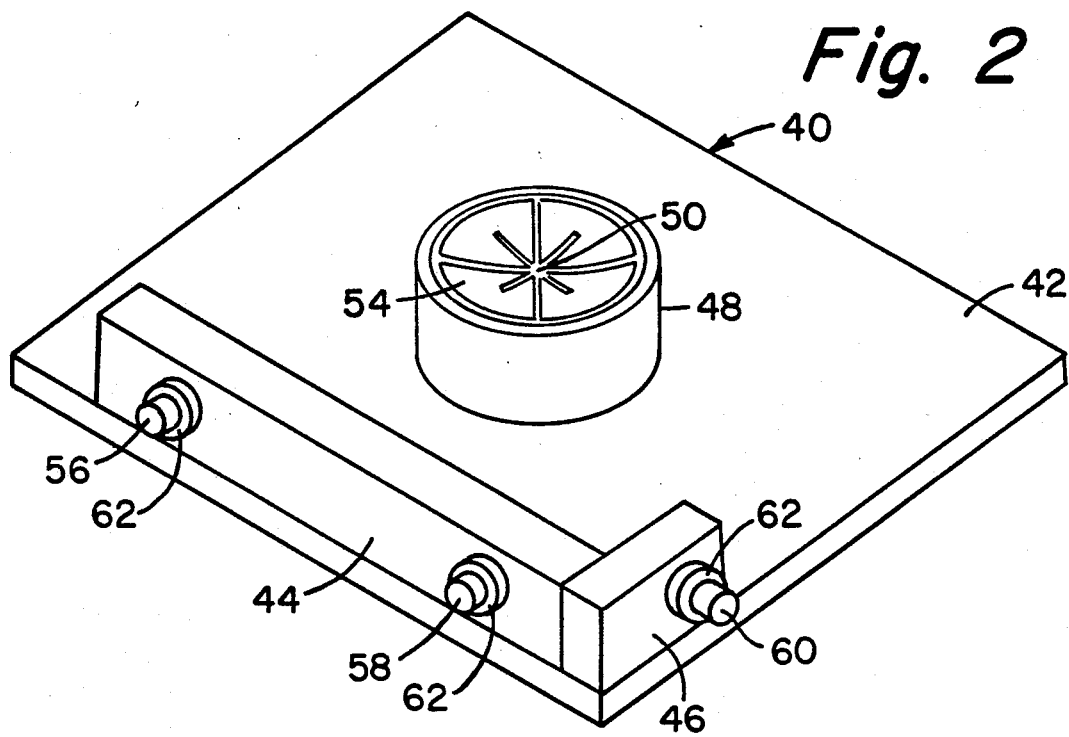
FIG. 2 is an isometric view of an alignment fixture for finishing an outer surface of the TV panel.
Figure 3:
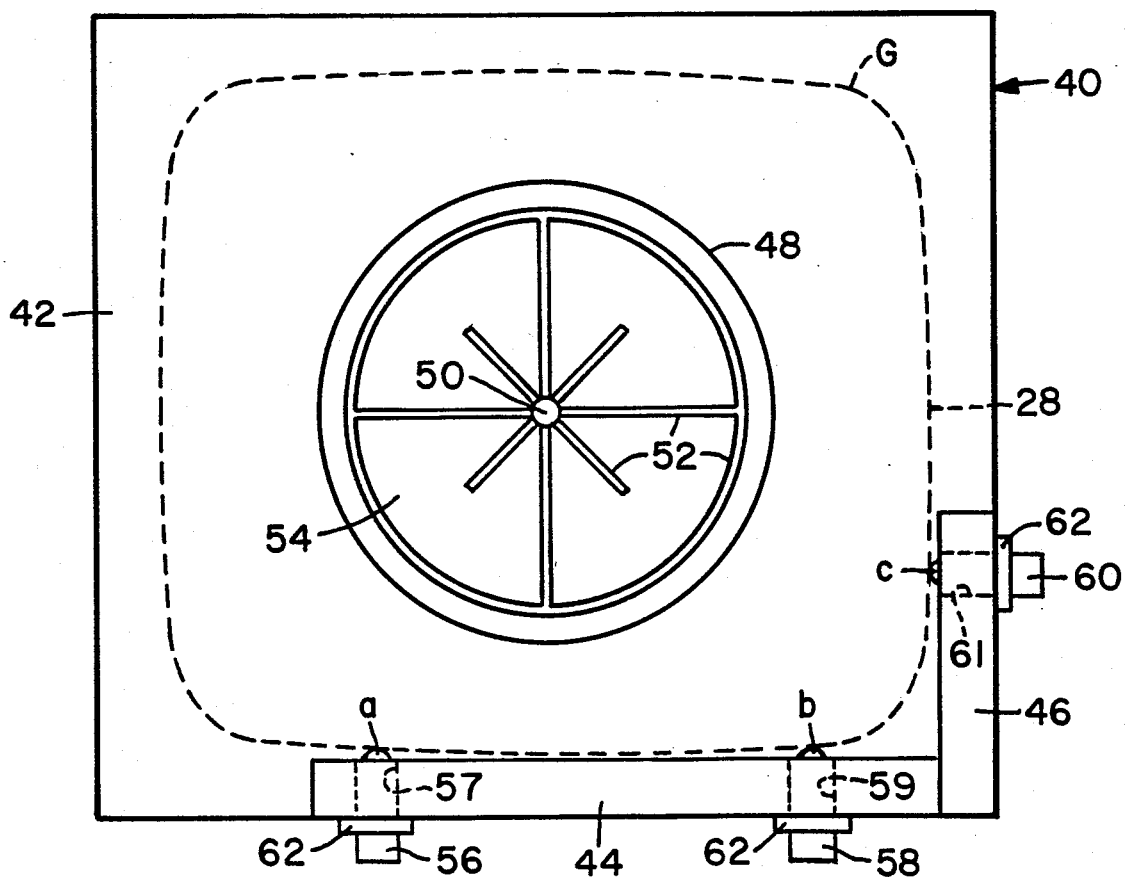
FIG. 3 is a top plane view of the fixture shown in FIG. 2 with a TV panel positioned in precise alignment, shown in phantom lines.

After the panels G have been pressed and annealed, the outer face 34 is ground and polished within a plane parallel to, and at a given distance from, the plane formed by points a, b, and c. In order to accomplish this result, a fixture 40 is provided as shown in FIGS. 2 and 3. The fixture includes a base plate 42, and a long guide rail 44 and a short guide rail 46 mounted on the base plate. A vacuum chuck 48 is also mounted substantially centrally on the base plate 42. A central vacuum passageway 50 extends through the chuck and communicates with a plurality of vacuum grooves 52 formed in the upper face 54 of the chuck 48. The central passageway 50 communicates at its outer end with a source of vacuum. The upper face 54 of the chuck 48 is precision machined to the same curvature and contour as the molded lens element 32 forming the inside surface of the glass panel G. The upper surface may be formed of a material such as urethane which is sufficiently resilient to conform to the inside shape of the lens and accomodate production tolerances.

A plurality of positioning pins 56, 58, 60, which may be formed of nylon material, extend through openings 57, 59 and 61, respectively, in the guide rails 44 and 46. A master panel is utilized to set the positionment of positioning pins 56, 58 and 60 so as to accurately locate points a, b and c on the rim portion of each panel G positioned on the fixture 40 for grinding. Once points a, b and c have been so located, by the pins 56, 58 and 60, the pins are locked in position by any suitable locking means such as locking nuts 62. The pins 56, 58 and 60 locate points a, b and c such that the center 26 of the lens element 32 is located centrally of the chuck 48. In addition, the distance between the height of the plane formed by the locating pins relative to a height of the center of the upper contoured chuck face 54, is identical to the vertical distance along central axis A between the center 26 of the lens element 32 and the plane of selected points a, b and c on the outer ring portion 28 of the panel G.

In operation, a panel G is positioned on the chuck surface 54 with the lens element 32 complementing the curvature of the contoured face 54. The panel is precisely located so that points a, b and c are in contact with locating or positioning pins 56, 58 and 60, respectively, so as to precisely align the panel G on the fixture 40. A vacuum is then applied to the chuck 48 by means of passageway 50 and grooves 52 to securely and firmly retain the panel in place on the chuck. A flat surface is then ground and polished on the outer surface 34 of the panel G, by any suitable means such as a Blanchard grinder. The ground and polished surface 34 is now accurately located with reference to identified points a, b and c and to the center 26 of the lens element 32. In fact, the ground and polished surface 34 lies within a plane which is parallel to, and at a known given distance from, the plane formed by the points a, b and c, so as to accurately locate the outer surface 34 with respect to such plane and the center of the lens element 32.

The panel is then assembled into a projection TV tube in the normal manner and sent to a set manufacturer. The set manufacturer receives the finished tube and then must place an external projection lens system upon the tube in correct orientation with respect to the internal lens element 32, which is under vacuum. However, with the known locations of outside reference points a, b and c formed on the outer rim portion 28 of the skirt portion 32 of panel G, and the known distance between the plane of such points and the plane of the ground and polished face 34 relative to the center 26 of the lens element 32, the set manufacturer simply references his external lens system on the flat ground surface 34 on the outside of the panel and aligns corresponding fixture points on his mounting ring with the outside reference points a, b and c formed on the outer ring portion 28. Accordingly the set manufacturer has then accurately located the inside lens surface 32 from the outside of the tube, and has accurately positioned his lens system on the geometric center of the inside lens element, and then locks the system in place on the tube by any known mechanical means.

Although we have disclosed the now preferred embodiments of our invention, it will be apparent to those skilled in the art that changes and modifications may be made thereto without departing from the spirit and scope thereof as defined in the appended claims.

We claim:

1. A method for locating the geometric center of an internal lens element which comprises:
    forming an internal lens element with an external reference surface which is concentric with a center line through said internal lens element;
    selecting and locating three reference points which are not all in a straight line on said reference surface such that said three points lie within a plane at a predetermined distance offset from the center of said lens element;
    providing a fixture having a central chuck configured to receive and complement said internal lens element, and a plurality of positioning pins positioned to correspond with said three reference points on said reference surface for positioning the center line of said internal lens element concentric with the center of said chuck;
    positioning said internal lens element on said chuck with said external reference surface in contact with said alignment pins positioned to locate said three reference points on said reference surface;
    firmly securing said lens element to said chuck and grinding and polishing a flat surface on an external surface opposite said internal lens element while said element is held in said fixture;
    grinding and polishing said external surface within a plane parallel to the plane formed by said three reference points and to a predetermined lens element thickness; and
    by utilizing the ground and polished external surface which is accurately located parallel to the plane of said three reference points and at a known center line distance with reference to said internal lens element, together with said three reference points on the external reference surface, locating the geometric center of the inside lens element.

2. A method of locating the geometric center of an internal lens element as defined in claim 1 including the step of aligning said positioning pins on said fixture with the use of a master lens element such that the aligning pins contact the external reference surface of each lens element at the preselected three reference points.

3. A method of locating the geometric center of an internal lens element as defined in claim 1 including the step of retaining said lens element on said chuck by applying a vacuum to the face of the chuck.

4. A method of locating the geometric center of an internal lens element as defined in claim 1 including the step of determining the thickness of the lens element by grinding and polishing said external surface to a plane parallel to the plane formed by said three reference points and at a predetermined distance from the plane of said three reference points.

5. A method of locating the geometric center of an internal lens element as defined in claim 1 including the steps of forming said internal lens element by pressforming a CRT panel with a face plate having an internal lens element and a skirt portion having an external reference surface.

6. A method of locating the geometric center of an internal lens element as defined in claim 1 including the steps of forming said internal lens element into a CRT with said lens element forming an internal surface of the CRT under vacuum, and affixing an external lens system to said CRT in alignment with said internal lens element by placing said external lens system on said ground and polished external surface of said CRT and utilizing said three reference points on said external reference surface to secure said external lens system thereon.

7. A method of externally locating the geometric center of an internal lens element which comprises:
    forming a TV panel from molten glass having a face plate and a skirt portion and simultaneously molding an internal lens element in the face plate and an external reference surface on the skirt portion;
    forming the external reference surface on the skirt portion so as to lie concentric with a central axis of said internal lens element;
    selecting three reference points on said external reference surface such that said points are not all in a straight line, with said points forming a plane which intersects said central axis at a predetermined distance from said internal lens element;
    providing a grinding and polishing fixture for the TV panel having pin means for locating said three reference points on the external reference surface of said panel and for centering the internal lens element upon a contoured chuck to accurately locate the lens element of the panel in three coordinates with respect to the three reference points and the plane formed thereby;
    securing said panel in position on said chuck;
    grinding and polishing the exterior surface of said TV panel so as to form a face plate of desired thickness with an outer surface lying within a plane parallel to the plane of the three reference points and at a predetermined distance therefrom;
    forming said ground and polished TV panel into a TV tube; and,
    aligning an external lens system with the geometric center of said internal lens element by utilizing the planer ground and polished external surface of the panel and the three reference points formed on the external reference surface of the skirt portion of said panel.

8. A method of externally locating the geometric center of an internal lens element as defined in claim 7 including the steps of press-forming said internal lens element by means of a plunger, forming a ring member having an internal surface which is concentric with a central axis passing through said plunger and internal lens element formed thereby, and mounting said ring element onto said plunger such that the central axis of said plunger and the axis of said ring element are coincident.

9. A method of externally locating the geometric center of an internal lens element as defined in claim 8 wherein said external reference portion is formed by the internal surface of said ring member so as to be concentrically referenced to the central axis of said internal lens element.

10. A method of externally locating the geometric center of an internal lens element as defined in claim 7 including the step of locating said pin means of said grinding and polishing fixture at the preselected reference points by means of a master panel positioned upon said contoured chuck.

11. A method of externally locating the geometric center of an internal lens element as defined in claim 7 including the step of securing said panel in position on said chuck by means of applying a vacuum to the contoured surface of said chuck.

12. A method of externally locating the geometric center of an internal lens element as defined in claim 7 including the step of aligning an attachment member of said external lens system with said three reference points formed on the exterior surface of said skirt portion for aligning said external lens system on said ground and polished surface of the panel.

* * * * *